(12) United States Patent
Ma et al.

(10) Patent No.: US 7,941,034 B2
(45) Date of Patent: May 10, 2011

(54) METHOD FOR ENCODING THE FLAG OF THE IMAGE

(75) Inventors: Siwei Ma, Beijing (CN); Yan Lu, Beijing (CN); Wen Gao, Beijing (CN); Yun He, Beijing (CN); Lu Yu, Beijing (CN); Jian Lou, Beijing (CN)

(73) Assignee: Institute of Computing Technology Chinese Academy of Sciences, Beijing (CN)

( * ) Notice: Subject to any disclaimer, the term of this patent is extended or adjusted under 35 U.S.C. 154(b) by 788 days.

(21) Appl. No.: 10/572,007

(22) PCT Filed: Jul. 5, 2004

(86) PCT No.: PCT/CN2004/000752
§ 371 (c)(1),
(2), (4) Date: Oct. 15, 2008

(87) PCT Pub. No.: WO2005/027522
PCT Pub. Date: Mar. 24, 2005

(65) Prior Publication Data
US 2009/0252482 A1    Oct. 8, 2009

(30) Foreign Application Priority Data
Sep. 12, 2003 (CN) ................................. 03 1 57076

(51) Int. Cl.
*H04N 5/78* (2006.01)
(52) U.S. Cl. ......... 386/314; 386/328; 386/354; 375/240
(58) Field of Classification Search .................. 386/314, 386/326, 328, 353–355; 375/240, 240.01, 375/240.13
See application file for complete search history.

(56) References Cited

U.S. PATENT DOCUMENTS
2004/0018002 A1* 1/2004 Kato et al. ...................... 386/94

FOREIGN PATENT DOCUMENTS
KR    1999-0063898    7/1999

OTHER PUBLICATIONS
Korean Examination Report of Korea Application No. 10-2006-7007001, dated Jan. 22, 2009.

* cited by examiner

*Primary Examiner* — Thai Tran
*Assistant Examiner* — Mishawn Dunn
(74) *Attorney, Agent, or Firm* — J.C. Patents

(57) ABSTRACT

The present invention discloses a method for encoding a flag of an image while encoding an I Frame, firstly setting a start code of an I Frame picture to be coded, for marking a start of the I Frame; setting a flag for indicating whether to code an identification field; judging the set flag, and if the flag indicates to encode the identification field of time and control code of a video tape recorder, encoding the identification field of time and control code of the video tape recorder, otherwise, not encoding the identification field of time and control code of the video tape recorder. In the present invention, the start code is added into the prediction picture header for marking the start of one frame picture data, as well as identifying whether there is the time_code identification field in the picture by the flag information of the time_code identification field, which can realize the objective of identifying the time_code identification field, and avoid encoding additional identification information, therefore it improves coding efficiency, and can be applied to all kinds of video/audio technical standards.

3 Claims, No Drawings

METHOD FOR ENCODING THE FLAG OF THE IMAGE

FIELD OF THE INVENTION

The present invention relates to an image/video encoding and decoding technology, and more particularly, to a method for encoding a flag of an image, which is in the technical field of video coding.

BACKGROUND OF THE INVENTION

Video coding technique is one of the foundations of multimedia application. Viewing the vigorously developing high-tech industries such as digital TV, new generation mobile communications, broadband communications network, family consumer electronics, the common techniques mostly concentrate on multimedia information processing technique of which the main content is video and audio, especially on the data compressing technique.

High efficient video coding and decoding technique is the key to realize storing and transmitting multimedia data at high quality and low cost. At present, the commonly used encoding and decoding methods include: predictive coding, orthogonal transform coding, vector quantization coding, etc. These methods are all based on the signal processing theory, which is also called $1^{st}$ generation coding technique; the currently popular international standards about picture coding are all based on this coding technique, which employs the method combined of motion compensation based on block matching discrete cosine transform and quantization. The typical international standardization organizations involved in the above technique, International Standardization Organization/International Electro-technical Commission, No. 1 Joint Technical Group (ISO/IEC JTC1), carried out international standards of MPEG-1, MPEG-2, MPEG-4, etc.; International Telecommunications Union (ITU-T) brought forward H.26x voluntary standard in series. These video coding standards are widely used in the industries.

All the aforesaid video coding standards adopt Hybrid Video Coding policy, usually including four main modules such as predicting, transforming, quantizing, information entropy coding etc.

The predicting module has the main function to predict the current image to be coded by using the coded and reconstructed image(inter prediction); or to predict to predict the current image part (or macro block) to be coded by using the coded and reconstructed image part (or macro block) in images (intra prediction); the transforming module has the main function to transform the input image block into another space so as to converge the energy of inputted signals at transform coefficient of low frequency for lowing relativity within the elements of image block and being useful for compressing; the quantizing module has the main function to map the transformed coefficient to a limited element aggregate helpful for coding; information entropy coding module has the main function to indicate the quantized transform coefficients with variable-length codes according to the statistical discipline. Video decoding system includes similar modules, mainly for reconstructing the decoded image through the procedures of entropy decoding, inverse quantizing, inverse transforming etc the input code streams Usually, the video coding/decoding system further includes some supplementary coding tools besides the above mentioned modules. These tools will also contribute to the coding performance (compression ratio) of the entire system.

In MPEG-2 system, Group of Picture (GOP) header is used in the front of one Intra Prediction encoding (hereinafter referred to as I Frame), which includes three kinds of identification field: the first identification field, broken_link, indicates whether the B Frame, which is closely behind I Frame, can be correctly reconstructed, for any modification or compile of the coded I Frame will affect the correct reconstruction of B Frame; therefore, it needs GOP header to indicate whether the B Frame, which is closely behind I Frame, can be correctly reconstructed; the second identification field, closed_gop, indicates whether the B Frame, which is closely behind I Frame, only uses the backward reference, and if only the backward reference is used, the B Frame, which is closely behind I Frame, can be reconstructed even if I Frame is modified; the third identification field, time_code, indicates "time and control code of video tape recorder", but it does not take effect at the decoding end.

The 59 bit identification needs to be introduced into the above three kinds of identification fields. However, the first two identification fields s (broken_link and closed_gop) are the identification fields adopted by the outdated technique, and fundamentally seldom used at present; the third identification field (time_code) is not necessary in most application circumstances, which is only used infrequently; therefore, if these identification fields are coded/decoded, it will affect the coding/decoding efficiency.

SUMMARY OF THE INVENTION

The present invention provides a method for encoding a flag of an image, which substitutes the picture header in intra-frame prediction for the GOP header for coding, to code the needed time_code identification field not code the broken_link and closed_gop identification fields while encoding the I Frame so that Coding I Frame by using the present invention can realize the objective of identifying the foregoing B Frame, avoid coding the needed information of additional identifications and improve coding efficiency.

The method for encoding a flag of an image, of the present invention comprises:

while encoding an I Frame, setting a start code of I Frame picture to be coded, for marking a start position of the I Frame; setting a flag for indicating whether to code time_code identification field; judging the set flag, and if the flag indicates to code the time_code identification field, encoding the time_code identification field, otherwise, not encoding the time_code identification field;

while decoding an I Frame, firstly searching the start code of the I Frame picture to determine a start position of one I Frame picture; then checking whether the flag indicates flag information of coding time_code identification field; if the flag indicates to code the time_code identification field, decoding the time_code identification field; otherwise, going on consequent decoding directly.

In the present invention, the start code is added into the prediction picture header for marking the start of one frame picture datum, as well as identifying whether there is the time_code identification field in the picture by the flag information of the time_code identification field, which can realize the objective of identifying the time_code identification field, and avoid coding additional identification information, therefore it improves coding efficiency, and can be applied to all kinds of video/audio technical standards.

DETAILED DESCRIPTION OF THE PREFERRED EMBODIMENTS:

The present invention has the characteristics of: while encoding the I Frame, substituting the picture header in intra-frame prediction for the GOP header for encoding, encoding the needed time_code identification field instead of encoding the three kinds of identification fields in the GOP header so that the former operation based on GOP can still be accomplished while decoding. A detailed embodiment is described as follows:

While encoding an I Frame, set an identification information i_picture_start_code in the prediction picture header as the start code of I Frame picture; i_picture_start_code marks the start of the frame picture datum as well as marks the coding type of the current picture as I Frame, and finding i_picture_start_code means that it marks the start of one GOP, since there is only one I Frame in one GOP, which is also the start frame of GOP; about the GOP operation, the position and content of the GOP can be determined by searching two adjacent i_picture_start_codes in the code stream dada.

Use the flag information time_code_flag with the length of one bit to mark whether to code the time_code identification field;

If the flag information of time_code_flag is 1, it denotes the time_code identification field is included in coding; and if the flag information of time_code_flag is 0, it denotes time_code identification field is not included in coding.

The parameter defined by the time_code identification field corresponds to the parameter defined in "time and control code of a video tape recorder" of IEC461 standard.

The former operation of GOP can determine the start of one GOP by searching I_picture_start_code, and proceed to random visiting, compiling, etc.; after compiling, it will not be necessary to code any information indicating whether some B frames can be normally decoded.

While decoding the above mentioned I Frame, at first, search the flag information of I_picture_start_code to determine the start of one I Frame picture;

Confirm whether the time_code identification field is coded by checking the flag information of time_code_flag;

If the flag information of time_code_flag is 1, it denotes the time_code identification field is coded; and if the flag information of time_code_flag is 0, it denotes time_code identification field is not coded.

Correspondingly, determine whether to decode the time_code identification field based on the value of said flag information of time_code_flag; obviously, when the flag information of time_code_flag is 1, decode the time_code identification field and then proceed to the consequent other decoding operations; otherwise proceed to the consequent other decoding operations directly.

The decoding procedures for said coding embodiment are as the follows:

At first, analyze the i_picture_start_code and get known the coding type of said picture is I Frame; at the same time, corresponding to know a new GOP datum is start;

Keep on the decoding procedure of the next grammar element, and after decoding the time_code_flag, if the time_code_flag is 1, decode the time_code, otherwise decode the consequent grammar element.

The former operation of GOP can still be accomplished by: firstly determining the start position of GOP by searching the i_picture_start_code; And The code stream data between the start code and the next i_picture_start_code as one GOP being operated A specific realization of the present invention based on C programming language is as follows:

```
i_picture_header( ) {
    i_picture_start_code;   //GOP start
    .....................
    time_code_flag;   //flag position
    if ( time_code_flag )//judge whether to code
    time_code;
    next_start_code( );   //next start code
}
```

In the above C programming language code; the function i_picture_header () is used for processing some data in I Frame picture header, in which an flag information named i_picture_start_code is used for indicating the start of one I Frame picture as well as the start of one GOP; in which the variable named time_code_flag is used for marking the state of whether to code "time and control code of a video tape recorder", and which can be specifically defined the meaning of the value, for example, when the value of time_code_flag variable is 1, it denotes to code the identification field of the time_code; when the value of time_code_flag vector is 0, it denotes not to code the identification field of the time_code. Function next_start_code () denotes operating next start code. Until now, processing of the start part of one I Frame picture header is completed.

It will be understood that the above embodiments are used only to explain but not to limit the present invention. In despite of the detailed description of the present invention with referring to above preferred embodiments, it should be understood that various modifications, changes or equivalents can be made by those skilled in the art without departing from the spirit and scope of the present invention.

What is claimed is:

1. A method for encoding a flag of an image, comprising steps of: while encoding an I Frame, firstly setting a start code of an I Frame picture to be coded, for marking a start of the I Frame; setting a flag for indicating whether to encode an identification field; judging the set flag, and if the flag indicates to encode the identification field of time and control code of a video tape recorder, then encoding the identification field of time and control code of a video tape recorder, else not encoding the identification field of time and control code of the video tape recorder;

while decoding an I Frame, firstly searching the start code of the I Frame picture to determine a start position of one I Frame picture; then checking information of the flag indicating whether to encode the identification field of time and control code of a video tape recorder; if the flag indicates to encode the identification field of time and control code of a video tape recorder, then decoding the identification field of time and control code of a video tape recorder, and then going on consequent decoding; else going on consequent decoding directly.

2. The method for encoding a flag of an image of claim 1, wherein a position corresponding to the start code acts as the start position of a new GOP datum when decoding.

3. The method for encoding a flag of an image of claim 1, wherein said GOP is code stream data between two adjacent start codes.

* * * * *